(12) United States Patent
Swinkels et al.

(10) Patent No.: US 9,357,278 B2
(45) Date of Patent: May 31, 2016

(54) IN-SKIN WAVELENGTH DIVISION MULTIPLEX (WDM) PATH COMPUTATION

(71) Applicant: Ciena Corporation, Hanover, MD (US)

(72) Inventors: Gerard Leo Swinkels, Ottawa (CA); Frederick James LaLonde, Ottawa (CA); Michael Stanley Wilgosh, Nepean (CA)

(73) Assignee: Ciena Corporation, Hanover, MD (US)

( * ) Notice: Subject to any disclaimer, the term of this patent is extended or adjusted under 35 U.S.C. 154(b) by 189 days.

(21) Appl. No.: 13/716,673

(22) Filed: Dec. 17, 2012

(65) Prior Publication Data

US 2014/0169791 A1   Jun. 19, 2014

(51) Int. Cl.
*H04L 12/28* (2006.01)
*H04Q 11/00* (2006.01)
*H04L 12/715* (2013.01)
*H04J 14/02* (2006.01)

(52) U.S. Cl.
CPC ........ *H04Q 11/0062* (2013.01); *H04J 14/0269* (2013.01); *H04L 45/04* (2013.01); *H04Q 2011/0073* (2013.01)

(58) Field of Classification Search
CPC .............................. H04L 45/04; H04J 14/0278
USPC ........................................................... 370/254
See application file for complete search history.

(56) References Cited

U.S. PATENT DOCUMENTS

2012/0102228 A1 *  4/2012  Cugini et al. ................. 709/242
2013/0163983 A1 *  6/2013  Skoog .............................. 398/5
2014/0156751 A1 *  6/2014  Bardalai et al. ............... 709/204

* cited by examiner

*Primary Examiner* — Mark Rinehart
*Assistant Examiner* — Matthew Hopkins
(74) *Attorney, Agent, or Firm* — Clements Bernard PLLC; Christopher L. Bernard; Lawrence A. Baratta, Jr.

(57) ABSTRACT

A method of managing an optical communication network having a plurality of nodes, the plurality of nodes including at least one regeneration site. A respective Path Computation Element (PCE) function is instantiated and associated with each regeneration site in the network. Each PCE function maintains a reach table containing information of viable optical paths extending from transceivers of its regeneration site. The PCE function implements a Recursive Path Computation algorithm to compute end-to-end routes through a physical layer of the network.

20 Claims, 6 Drawing Sheets

IN-SKIN WAVELENGTH DIVISION MULTIPLEX (WDM) PATH COMPUTATION

CROSS-REFERENCE TO RELATED APPLICATIONS

This is the first application filed in respect of the present invention.

FIELD OF THE INVENTION

The present application relates generally to management of communications networks, and more specifically to techniques for in-skin wavelength division multiplex (WDM) path computation.

BACKGROUND

In modern optical communications networks it is common practice to implement a control plane (eg as defined in ITU-T recommendation G.8080) for network topology discovery and route computation. Typically, the control plane deploys various protocols that enable each node of the network to populate a respective topology database that may subsequently be used to compute end-to-end routes through the network. One such protocol is Open Shortest Path First (OSPF), although there are others. As is typical of network discovery and route computation protocols, OSPF defines various types of Link State Advertisement (LSA) messages, which may be flooded into the network by a node to convey network topology information to all of the other nodes in the network. Accordingly, a given node can use the information contained in received LSAs to populate and maintain its topology database.

OSPF and similar topology discovery and route computation protocols are commonly referred to as "in-skin", because the topology discovery and route computation functionality is distributed across the nodes of the network, rather than being localized in one or more central servers.

A limitation of control-plane based protocols such as OSPF is that lower-cost network nodes often lack sufficient resources to store and process the volume of information that would be needed to enable extension of OSPF-like topology discovery and route computation functionality in the physical layer of the network. Furthermore, the volume of LSA-like messaging that would be needed to maintain an accurate view of the physical network would be burdensome for all but the most trivial of network topologies. Consequently, network operators typically utilize a centralized Path Computation Element (PCE) or server to compute end-to-end paths through the network physical layer.

However, as networks grow in size and complexity, the use of a centralized PCE may become disadvantageous. A known alternative is to divide the network into two or more sub-domains, each of which is associated with a respective PCE. However, this arrangement can increase complexity of network management, and does not address the problem that separate topology discovery and route computation functions are performed by different systems in different layers of the network. Many network service providers would prefer a single 'in-skin" solution for all layers of the network.

Techniques that enable "in-skin" path computation through the physical layer of a communications network are therefore highly desirable.

SUMMARY

An aspect of the present invention provides a method of managing an optical communication network having a plurality of nodes, the plurality of nodes including at least one regeneration site. A respective Path Computation Element (PCE) function is instantiated and associated with each regeneration site in the network. Each PCE function maintains a reach table containing information of viable optical paths extending from transceivers of its regeneration site. The PCE function implements a Recursive Path Computation algorithm to compute end-to-end routes through a physical layer of the network.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The present application provides techniques for "in-skin" path computation through the physical layer of a communications network.

In general terms, the present technique employs a PCE function associated with each regeneration site in the network. A recursive-path computation algorithm can then be used to compute end-to-end routes through the network.

For the purpose of understanding the present disclosure, an optical fiber link shall be understood to refer to a physical optical connection capable of carrying a Wavelength Division Multiplexed (WDM) optical signal between two nodes in the network. A WDM signal typically comprises a plurality of individual wavelength channels, each of which has a predetermined bandwidth and center frequency (wavelength) in accordance with a predetermined spectral grid. As such, each wavelength channel represents a unit of bandwidth capacity which may be used to transport data through an optical fiber link. An "optical channel" refers to a point-to-point connection utilizing a selected wavelength channel between a pair of transceivers, which are configured to transport an optical channel signal through the connection. An optical channel signal refers to a multiplex of data signals formatted for transport within a wavelength channel of the WDM signal.

An OEO site may be any network node that includes transceivers capable of terminating one or more optical channels of the network. A Reconfigurable Optical Add-Drop Multiplexer (ROADM) is an example of an OEO site. A regeneration site is a type of OEO site, which also includes electronic channel switching capability. Thus a regeneration site is capable of routing an optical channel signal between a pair of optical channels.

The present technique implements PCE functionality in association with each regeneration site in the network. At each such regeneration site, the associated PCE function operates to maintain a respective reach table that contains information of available optical wavelength channels between the regenerator site and any OEO sites that are reachable through of the network.

Figure 1:
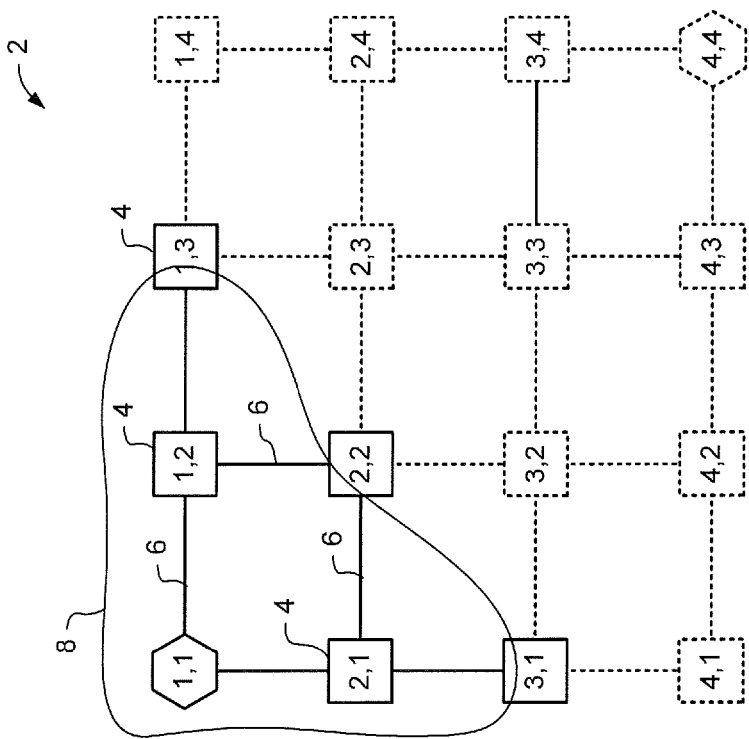
FIG. 1 is a block diagram illustrating a representative network in which methods of the present invention may be implemented.

FIG. 1 schematically illustrates an optical network 2 comprising physical layer nodes 4 connected in a rectangular mesh by optical fiber links 6, each of which supports a WDM optical signal. At each node of the network, an inbound WDM signal may be optically demultiplexed so that its individual wavelength channels can be independently routed (eg via optical pass-through), dropped, or regenerated in accordance with the capabilities of the specific node. For the purposes of the present description, each node is also assumed to be a regeneration site, although that is not necessary.

The portion of the network that can be photonically reached (that is, without any intermediate regenerations) from a given optical transceiver may conveniently be referred to as that transceiver's "local region". For example, FIG. 1 shows a representative local region 8 of a transceiver in node 1,1, which encompasses nodes 1,2; 1,3; 2,1; 2,2; and 3,1, all of which are photonically reachable from that transceiver in node 1,1. As may be appreciated, a given node will typically include a plurality of transceivers. In addition, there may be multiple different types (eg, make and model) of transceivers, with corresponding different performance levels and signal reach in the network. As such, each transceiver in a given node has a respective local region in the network, which defines the respective portion of the network that can be photonically reached from that specific transceiver. The respective local region of one transceiver in a given network node may be the same as, or different than, the respective local region of another transceiver in the same network node. For ease of illustration and description, in the following description every transceiver in a given node is assumed to have the same signal reach, and thus coincident local regions. In this case, it is convenient to refer to the local region of the node. However, it is expected that many nodes will have transceivers with differing signal reach, and thus with non-coincident local regions, in that case, each local region will necessarily be associated with its respective set of one or more transceivers.

Figure 2:
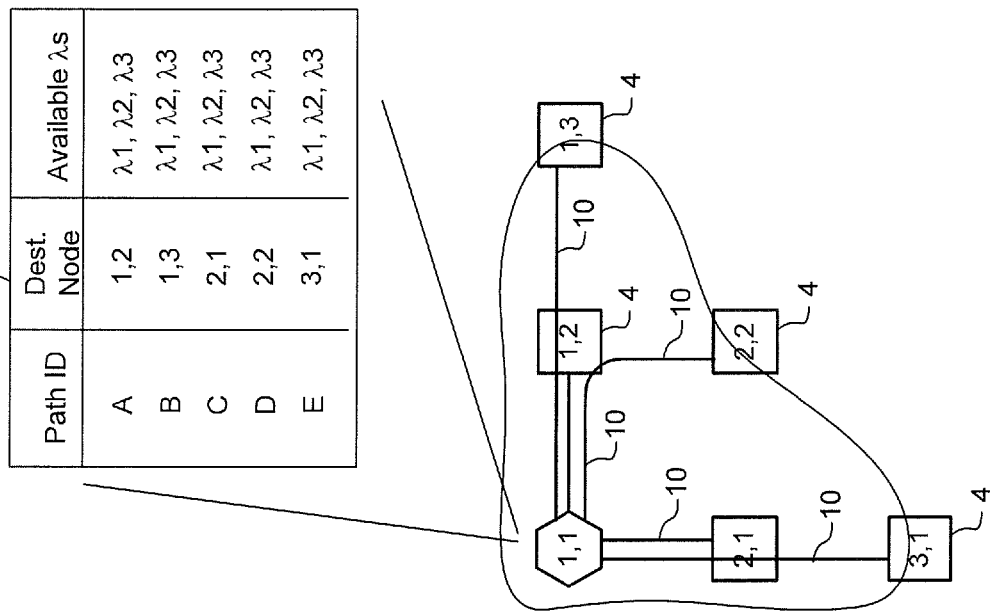
FIG. 2, is a block diagram illustrating a local region of the network of FIG. 1.

In some embodiments, the local region 8 of each node (or respective set of one or more transceivers of each node) of the network may be defined by analyzing the known configuration of installed network equipment. For example, the performance characteristics of each network node, the topology of optical fiber connections between nodes, and the optical properties of each fiber connection are known from the design and layout of the network. This information may be analysed using known methods to derive a respective set of viable optical paths originating at any given node. Alternatively, viable optical paths may be derived from optical channels that have previously been successfully set up in the network. FIG. 2 shows a representative set of viable optical paths 10 originating at node 1,1, which therefore define the local region of that node.

It will be appreciated that every regeneration site of the network will have its own local region(s), which is(are) defined entirely by photonic reachability from the transceivers of that node. Consequently, the respective local regions of neighbouring regeneration sites may overlap. This fact represents a distinction between the local regions of the present technique and conventional photonic islands or domains described above.

In accordance with the present technique each regeneration site has an associated PCE function, which maintains a reach table for that node. Thus, for example, the PCE function of node 1,1 will maintain a reach table 12 containing information about the viable optical paths defining its local region, as may been seen in FIG. 2. In the example of FIG. 2, the reach table 12 comprises, for each viable optical path 10, a respective path identifier, an identifier of the destination node that terminates the optical path, and a listing of wavelength channels that may be used for that Optical path. Other information may also be included in the reach table, as desired.

The reach table of each regeneration site may be populated in advance with information of viable paths derived from the network equipment configuration as described above. In some cases, the reach table may be updated to reflect actual wavelength channel availability due to allocation of resources to optical channels as they are set up in the network.

Figure 3C:
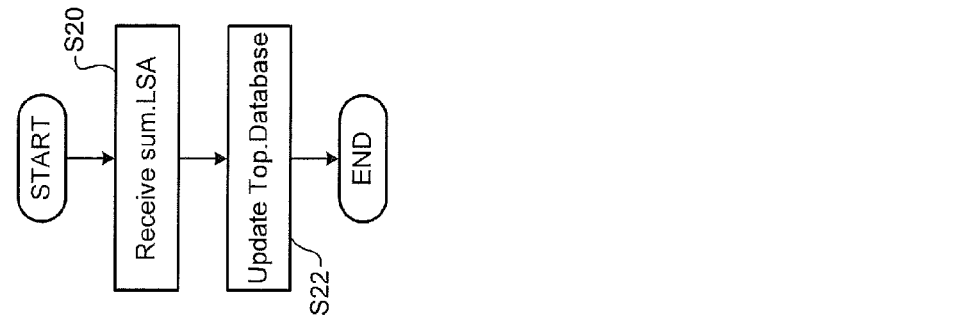
FIGS. 3A-3C are flow-charts illustrating principal steps in a constrained forwarding algorithm.
Figure 3B:
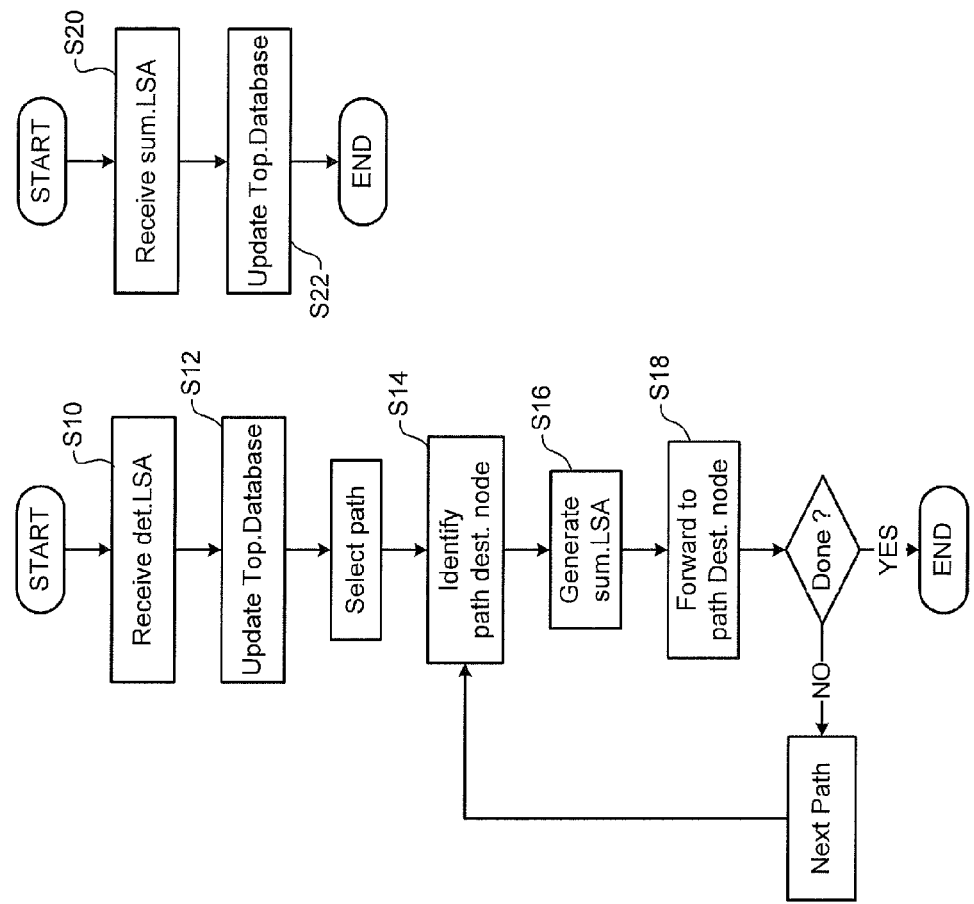
Figure 3A:
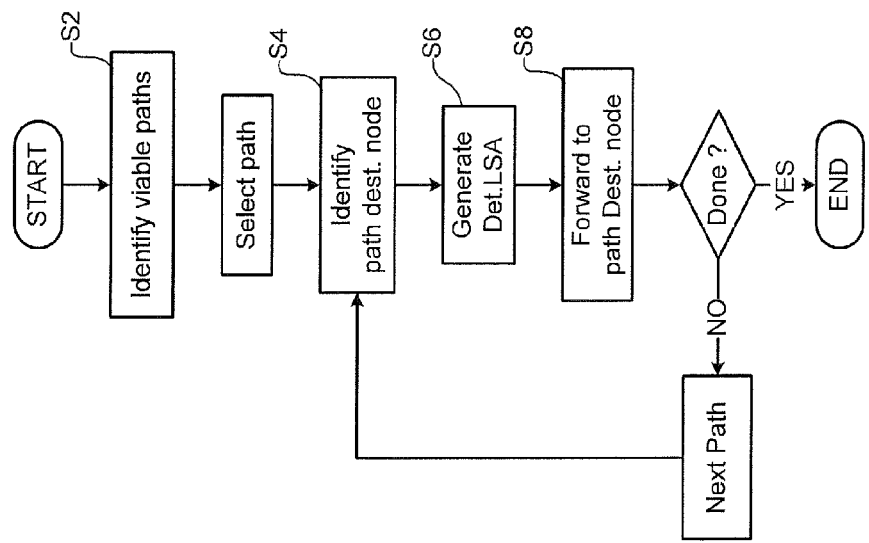

FIGS. 3A-C illustrate a representative constrained forwarding technique which may be used to exchange topology information between nodes within the network. Referring to FIG. 3A, each node may execute an algorithm to forward detailed topology information (such as, for example, node/port status, available wavelength channels, available bandwidth etc.) to each node within its own local area. Thus, for example, node 1,1 may execute the method of FIG. 3A to forward detailed topology information to each of nodes 1,2; 1,3; 2,1; 2,2; and 3,1. In the method of FIG. 3A, the node may examine (at step S2) its reach table to identify viable optical paths extending to each of the other nodes within its local region. For each identified path, the node may retrieve the respective destination node (at step S4) of that path from the reach table, generate a detailed LSA-type message (det.LSA) at step S6 and forward it to the identified path destination node (at step S8). Referring to FIG. 3B, upon receipt of a detailed LSA-type message (det.LSA) at step S10, a node may operate to update its topology database (at step S12) using information extracted from the message. The node may then examine its reach table to identify viable optical paths extending to each of the other nodes within its local region. For each identified path, the node may retrieve the respective destination node of that path (at step S14) from the reach table, generate a summary LSA-type message (sum.LSA) (at step S16) containing summary information derived from the received det.LSA message, and forward the sum.LSA message to the identified path destination node (at step S18). Referring to FIG. 3C, upon receipt of a sum.LSA message (at step S20), a node may operate to update its topology database (at step S22) using summary information extracted from the message.

In the embodiment of FIGS. 3A-C, a given node will exchange detailed topology information of a given viable path only with its photonically reachable neighbour node on that same path. However, that neighbour node will only forward summary information pertaining to that path to its photonically reachable neighbour nodes, and it will not forward any information contained in received summary LSA-type messages. In this embodiment, a given node can accumulate and maintain a topology database containing detailed topology information of its own local region only, and summary information of viable paths extending one hop beyond the boundaries of its local region. This arrangement provides sufficient information to enable computation of end-to end paths through the network, while constraining both the volume of LSA-type messaging in the network and the node resources required to maintain the topology database. In an alternative embodiment, summary LSA-type messages may be propagated throughout the network. In this case, a given node can accumulate and maintain a topology database containing detailed topology information of its own local region only, and summary information of viable paths elsewhere in the network.

In some embodiments, the timing at which detailed and summary LSA-type messages are sent may be chosen based, for example, on a priority or importance of the LSA-type messages. For example, detailed LSA-type messages may have a high priority or importance, because they contain information that is needed for both failure recovery and the allocation of resources to new routes. Accordingly, detailed LSA-type messages may be generated and sent by a node promptly upon detection of a topology change. On the other hand, summary LSA-type messages may have a lower priority or importance, because they contain information that is used primarily for route computation. Accordingly, summary LSA-type messages may be generated and sent by a node at a relatively low frequency. For example, summary LSA-type messages may be sent on a predetermine schedule (for example a predetermined times of day, or at a predetermined frequency). Alternatively, summary LSA-type messages may be sent when a predetermined criteria is satisfied. For example, a node may generate and send a single summary LSA-type message that summarizes information contained in a predetermined number of received detailed and/or summary LSA type messages. Other variations are also possible, and may be used as desired.

It will be appreciated that the detailed and summary LSA-type messages may take any suitable form, and may be processed in any suitable manner. The reference to "LSA-type" messages is merely an acknowledgment that the messages are used for a purpose that is analogous to LSA messages used in conventional topology discovery protocols such as OSPF.

Figure 4:
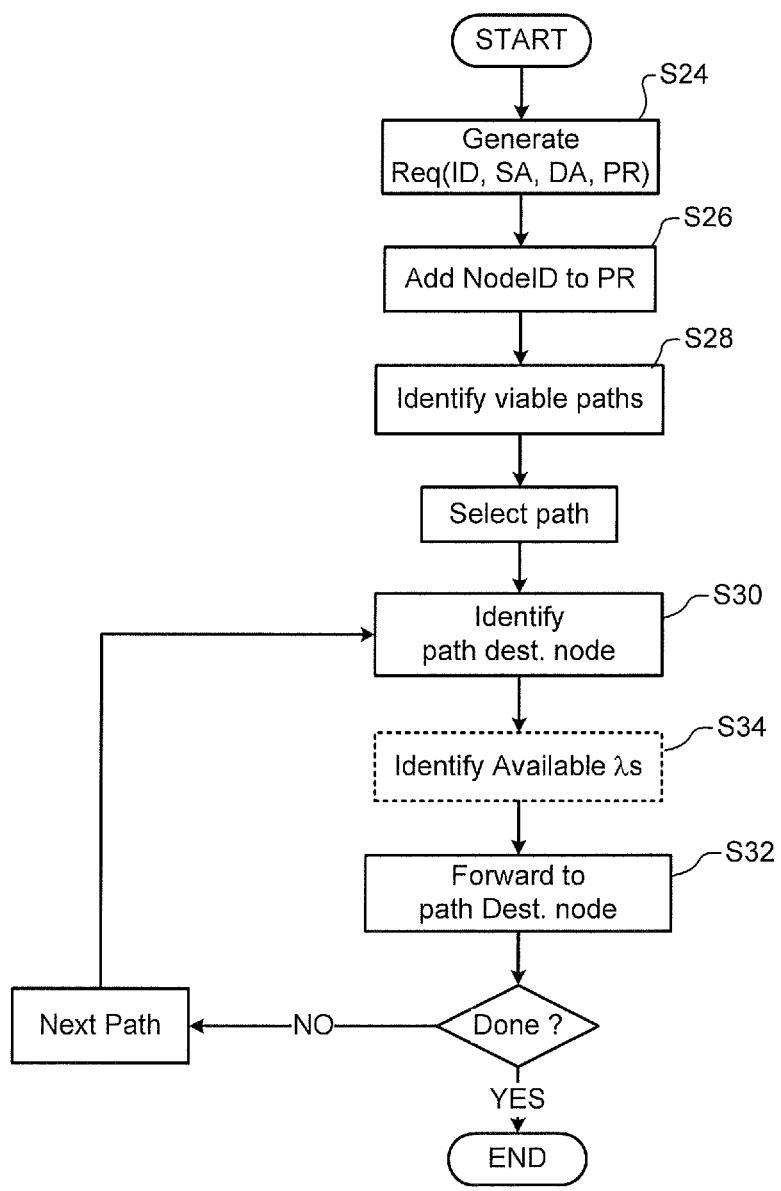
FIG. 4 is a flow-chart illustrating principal step of a method implemented by a source node in the network of FIG. 1.

In order to compute an end-to end path between two nodes in the network, each PCE function may execute a common algorithm, which therefore implements a distributed path computation process. For example consider a scenario in which an end to end path between a source node (S) and a destination node (D) is to be computed. Referring to FIG. 4, the source node may initiate the process by generating a Request message (at step S24) containing a connection identifier (ID), its own address as Source Address (SA), the address of the destination node as the Destination Address (DA), and a path record (PR). The connection identifier (ID) uniquely identifies the desired end-to-end connection, at least among connections terminated at the source node. Inclusion of this information in the request message enables any downstream nodes to identify when multiple messages relate to the same connection request The PR is used to accumulate a record of each node visited by the request message as it propagates through the network, along with relevant path computation information associated with each visited node. If desired, each node identified in the PR may be identified using a node identifier (nodeID), the node's network address, or any other suitable information. The first entry in the PR (step S26) identifies the source node. The source node may then examine its reach table to identify (at step S28) viable optical paths extending to each of the other nodes within its local region. For each identified path, the source node may retrieve (at step S30) the respective destination node of that path from the reach table, and forward a copy of the request message to the identified path destination node (at step S32). If desired, the source node may also retrieve a listing of available wavelength channels from the reach table (at step S34), and include this information in the request message sent to the path destination node.

Figure 5:
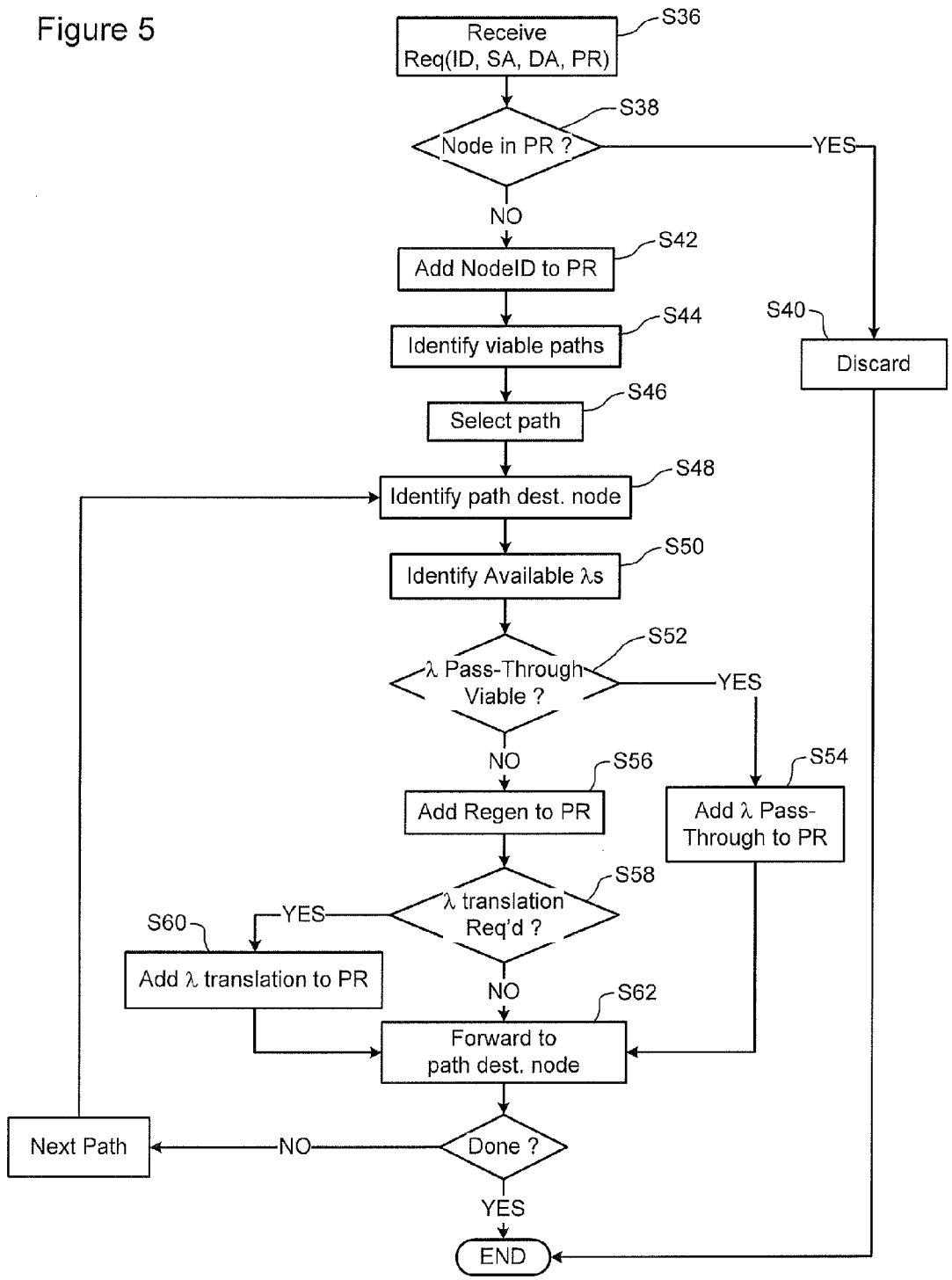
FIG. 5 is a flow-chart illustrating principal step of a Recursive Path Computation (RPC) algorithm implemented by a regeneration site in the network of FIG. 1.

FIG. 5 is a flow-chart illustrating principle steps in a representative process that may be implemented in each PCE function (regeneration site) for processing and forwarding received request messages received from another node in the network. As may be seen in FIG. 5, when the request message is received (step S36), the path record (PR) may be checked to determine (step S38) whether the node's identifier is already in the PR. If it is, the received request message has completed a loop through the network, and so may be discarded (step 40), Otherwise, the node adds its identifier to the PR (step S42), and checks its reach table to identify viable optical paths (step S44) originating from that node. A first one of the identified paths is selected (step S46), and the node may retrieve the respective path destination node (step S48) and available wavelength channels (step S50) of that path from the reach table. The node may then examine the PR and the available wavelength channels to determine (step S52) whether an optical pass-though to the selected (downstream) optical path is viable. If it is, then information regarding the optical pass-through function may be added (step S54) to the PR. If an optical pass-through is not viable, regeneration of the channel is necessary and information to that effect may be inserted into the PR (step S456). The node may also examine the wavelength channels available on the selected path to determine (step S58) whether wavelength translation is needed as part of the regeneration function. If wavelength translation is needed, then information regarding the wavelength translation function may be added (step S60) to the PR. With the PR thus updated, the node then forwards the request message (step S62) to the respective path destination node of the selected path. This process of selecting a path, determining viability of optical pass-through, determining the need for wavelength translation and forwarding the request message to the respective destination node of the selected path is repeated for each of the identified viable optical paths.

As may be appreciated, the methods described above with reference to FIGS. 4 and 5 will produce a cascade of request messages propagating through the network, so that the destination node (D) will ultimately receive multiple messages from multiple adjacent nodes. Each of the request messages received by the destination node contains a respective path record detailing a viable path between the source node and the destination node. The destination node can thus examine each of the path records, to select a preferred path for the end-to-end connection. The preferred path may be selected in accordance with any desired criteria, which may include, for example, path cost, number of hops, number of regenerations, number of optical pass-throughs, number of wavelength translations. Once the preferred path has been selected, the destination node may generate a reply message containing the connection identifier (ID), the Source Address (SA), the Destination Address (DA), and the path record (PR) detailing the chosen preferred path.

In some embodiments, the reply message is sent to the source node, to initiate set-up of an end-to-end connection following the preferred path through the network. In some embodiments, the reply message is propagated backwards through the preferred path, hop-by-hop from the destination node to the source node. At each node of the path, the information in the PR may be used to set up the connection (eg optical pass-through, regeneration, wavelength translation etc.) through the node.

In the example of FIG. 5, the node may detect that the request message has completed a loop through the network by checking the received request message to determine whether its own node ID is already in the PR. If such a loop is detected, the request message can be discarded. In an alternative approach, the forwarding process of FIG. 5, can be modified such that the node will not forward a request message to any nodes that are already in the PR. This means that the request message is discarded one hop before the loop actually forms, which has the advantage of reducing the volume of request message traffic within the network.

Figure 6B:
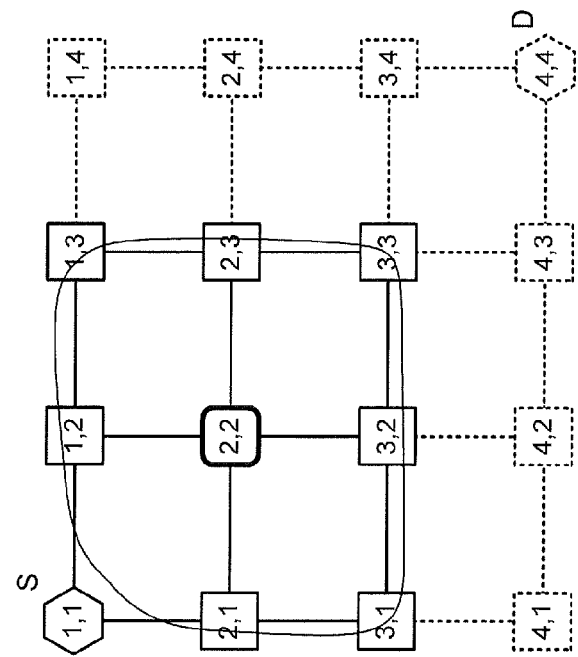
FIGS. 6A-6C are block diagrams illustrating operation of the RPC of FIG. 4.
Figure 6A:
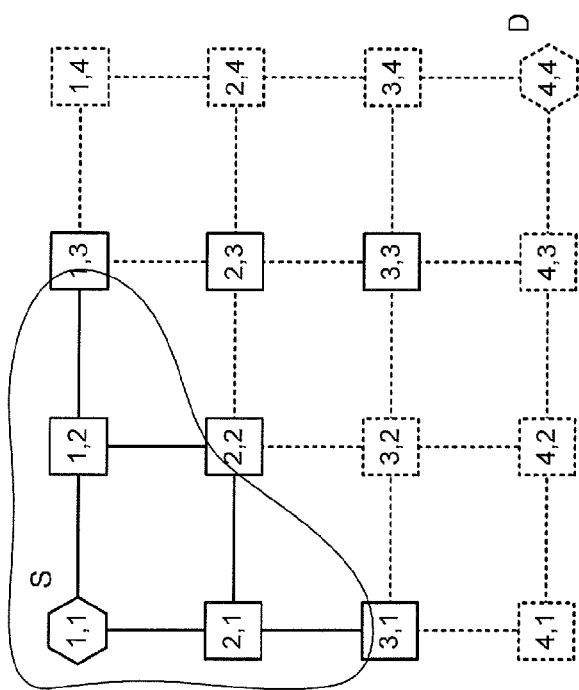
Figure 6C:
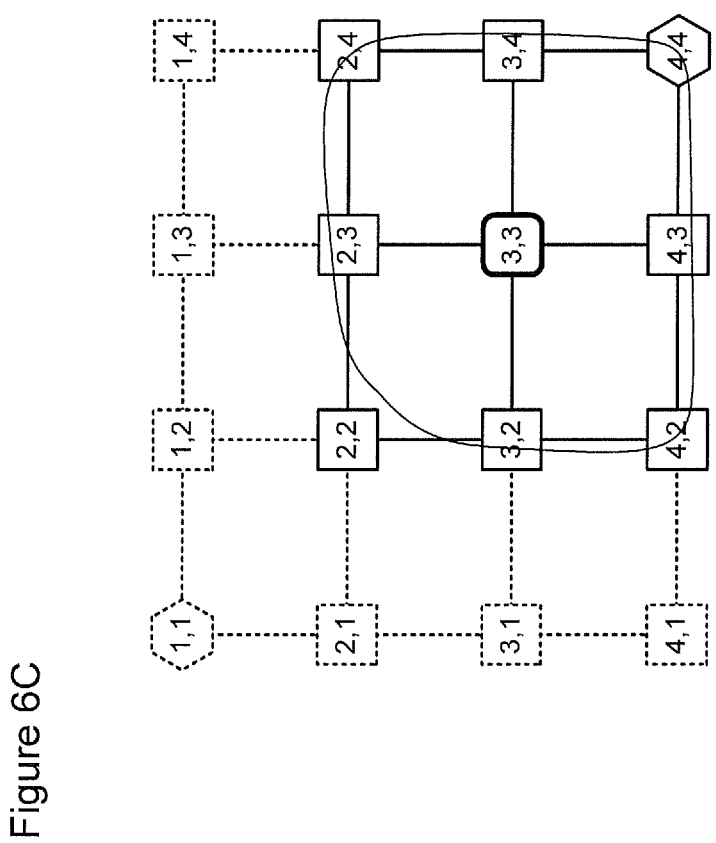

FIGS. 6A-C illustrate operation of the methods described above with reference to FIGS. 4 and 5, in a representative scenario in which a path is calculated from node 1,1 (as source node), to node 4,4 (as destination node) in the network of FIG. 1.

Referring to FIGS. 4 and 6A, the source node (node 1,1) formulates and sends request messages to the respective path destination nodes (1,2; 1,3; 2,1; 2,2; 3,1) of the viable optical paths identified in its reach table (FIG. 2). Each of these nodes will then execute the method described above with reference to FIG. 5 to propagate the request message through the network. For example, node 2,2 will receive a request message from node 1,1, and will propagate this request message to the respective path destination nodes (e.g. nodes 1,2; 1,3; 2,1; 2,3; 3,1; 3,2; 3,4) of the viable optical paths identified in its own reach table, as mat be seen in FIG. 6B. Note that the request message is not propagated to node 1,1 (the source node), because that node is already identified in the PR of the request message.

It will be seen that node 2,2 will also receive request messages indirectly from node 1,1 via nodes nodes 1,2; 1,3; 2,1; and 3,1. In some embodiments, node 2,2, may discard these request messages because it has already received and processed a request message (ie, directly from node 1,1) pertaining to that connection. Discarding second (and later) instances of a request message has an advantage of limiting the volume of request message traffic in the network. Furthermore, second and later instances of a request message may also be discarded by a node having a non-blocking (fully connected) switch instance. However, it is possible that the first instance of the request message processed by any given node may not contain the best possible path, according to the selection criteria applied by the destination node. Accordingly, in some embodiments, request messages are discarded only to prevent loops, but messages traversing an indirect route are processed. Similarly, in the case of nodes that have a blocking (partially connected) switch instance, a second (or later) instance of a request message may only be discarded if the message instance in question is non-unique for the switch instance.

Returning to the example of FIGS. 6A-C, node 2,2 will propagate the request message to nodes 1,2; 1,3; 2,1; 2,3; 3,1; 3,2; 3,4, each of which will then execute the method described above with reference to FIG. 5 to propagate the request message through the network. For example, as may be seen in FIG. 6C, node 3,3 will receive a request message from node 2,2, and will propagate this request message to the respective path destination nodes (e.g. nodes 2,3; 2,4; 3,2; 3,4; 4,2; 4,3; 4,4). Note that the request message is not propagated to node 2,2, because that node is already identified in the PR of the request message received from node 2,2.

It will be seen that node 4,4 (the destination node) will receive request messages from directly from node 3,3 and indirectly from node 3,3 via nodes 3,4 and 4,3. Thus the destination node will receive multiple request messages, each of which contains information detailing a respective different viable path through the network. The destination node can therefore analyse the path records of the received request messages to select a preferred path in accordance with any desired criteria.

As may be seen in the example of FIGS. 4-6, some of the request messages propagated through the network may follow a very indirect route to the destination. While these messages may contain a PR defining a valid path to the destination, there may be a substantial delay and any such path is unlikely to be selected as the preferred path. As such, the destination node may implement any suitable method for limiting the time delay during which it will wait for request messages pertaining to any given end-to-end connection and/ or the number of request messages that it will consider to select the preferred path. For example, the destination node may operate to consider the first three request messages that it receives, and discard any other request messages.

A alternative approach is to implement a Time-To-Live (TTL) function in respect of the request messages. In this case, the source node may insert a TTL parameter detailing a predetermined maximum number of hops that can be traversed by the request message before it is discarded.

The path computation method described above with reference to FIGS. 4-6 may be referred to as a forward recursive computation method because the path is computed by propagating request messages through the network from the source node to the destination node. An alternative method is to implement a backward recursive algorithm, in which the request messages are propagated from the destination node to the source. In this case, the path computation process may be triggered by a path set-up message sent to the destination node via a control plane, for example.

The embodiments of the invention described above are intended to be illustrative only. The scope of the invention is therefore intended to be limited solely by the scope of the appended claims.

We claim:

1. A method of managing an optical communication network comprising a plurality of nodes, the plurality of nodes including at least two regeneration sites, the method comprising maintaining, by each regeneration site, a reach table containing information of a set of viable optical paths defining a respective local region of the regeneration site, each viable optical path of the set extending from the regeneration site and terminating at a respective photonically reachable neighbor nodes of the regeneration site and being configured to support a photonic connection between the regeneration site and the respective neighbor node; and computing, by each regeneration site, a connection through the respective local region of the regeneration site by:
  identifying, using the reach table, each one of the set of viable optical paths extending from the regeneration site; and
  for each identified viable optical path, sending a request message to the respective neighbor node terminating the identified viable optical path.

2. The method of claim 1 wherein each neighbor node is an Optical-Electric/Electric-Optical (OEO) node of the network.

3. The method of claim 2 wherein the information of viable optical paths comprises, for each viable optical path any one or more of:
  a path identifier;
  a path destination node identifier identifying the neighbour node; and
  a list of available wavelength channels of the path.

4. The method of claim 3 wherein the regeneration site is a source node of the connection, and wherein computing the connection through the respective local region of the regeneration site comprises generating the request message.

5. The method of claim 4 wherein the request message comprises:
   a source address identifying a source node of a desired end-to end connection;
   a destination address of a destination node of the desired end-to-end connection; and
   a path record including information identifying each node of the network traversed by the request message.

6. The method of claim 1 wherein the regeneration site is an intermediate node of the connection, and wherein computing the connection through the respective local region of the regeneration site comprises steps of:
   receiving, by the regeneration site, the request message from a first neighbor node;
   updating the received request message; and
   for each identified viable optical path, sending the updated request message to the respective neighbor node terminating the identified viable optical path.

7. The method of claim 6 wherein updating the received request message comprises adding a node identifier of the regeneration site to the request message.

8. The method of claim 7 wherein updating the received request message further comprises determining whether an optical pass-through is viable, and if an optical pass-through is viable adding corresponding optical pass-through information to the request message.

9. The method of claim 7 wherein updating the received request message further comprises determining whether wavelength translation is required, and if wavelength translation is required adding corresponding wavelength translation information to the request message.

10. The method of claim 7 wherein updating the received request message further comprises adding a list of available wavelength channels of the identified viable optical path.

11. The method of claim 2, wherein a first neighbor node terminating a respective first viable optical path is another regeneration site of the network, and wherein the method further comprises the regeneration site exchanging detailed link state information of the first viable optical path with the first neighbor node.

12. The method of claim 11, further comprising the regeneration site receiving, from the first neighbor node, summary link state information of viable optical paths extending from the first neighbor node.

13. The method of claim 11, further comprising the regeneration site receiving, from the first neighbor node, summary link state information of viable optical paths elsewhere in the network.

14. A non-transitory computer-readable storage medium comprising software code for execution by a regeneration site of an optical communications network having at least two regeneration sites, the software code controlling the regeneration site to perform the steps of:
   maintaining a reach table containing information of a set of viable optical paths defining a respective local region of the regeneration site, each viable optical path of the set extending from the regeneration site and terminating at a respective photonically reachable neighbor nodes of the regeneration site and being configured to support a photonic connection between the regeneration site and the respective neighbor node; and
   computing a connection through the respective local region of the regeneration site by:
      identifying, using the reach table, each one of the set of viable optical paths extending from the regeneration site; and
      for each identified viable optical path, sending a request message to the respective neighbor node terminating the identified viable optical path.

15. A node of an optical communications network having at least two regeneration sites, the node being a regeneration site of the network and being configured to:
   maintain a reach table containing information of a set of viable optical paths defining a respective local region of the regeneration site, each viable optical path of the set extending from the regeneration site and terminating at a respective photonically reachable neighbor nodes of the regeneration site and being configured to support a photonic connection between the regeneration site and the respective neighbor node; and
   compute a connection through the respective local region of the regeneration site by:
      identifying, using the reach table, viable optical paths extending from the regeneration site; and
      for each identified viable optical path, sending a request message to the respective neighbor node terminating the identified viable optical path.

16. The node as claimed in claim 15 wherein each neighbor node is an Optical-Electric/Electric-Optical (OEO) node of the network.

17. The node as claimed in claim 15 wherein the regeneration site is a source node of the connection, and wherein computing the connection through the respective local region of the regeneration site comprises generating the request message.

18. The node as claimed in claim 15 wherein the request message comprises:
   a source address identifying a source node of a desired end-to end connection;
   a destination address of a destination node of the desired end-to-end connection; and
   a path record including information identifying each node of the network traversed by the request message.

19. The node as claimed in claim 15 wherein the regeneration site is an intermediate node of the connection, and wherein computing the connection through the respective local region of the regeneration site comprises steps of:
   receiving, by the regeneration site, the request message from a first neighbor node;
   updating the received request message; and
   for each identified viable optical path, sending the updated request message to the respective neighbour node terminating the identified viable optical path.

20. The node as claimed in claim 19 wherein updating the received request message comprises adding a node identifier of the regeneration site to the request message.

* * * * *